Oct. 26, 1926.　　　　　　　　1,604,501
S. R. THOMAS
STEERING COLUMN STRUCTURE
Filed Jan. 15, 1925

Inventor
S. R. Thomas
By Lloyd L. Evans
Attorney

Patented Oct. 26, 1926.

1,604,501

UNITED STATES PATENT OFFICE.

STANLEY R. THOMAS, OF CLEVELAND, OHIO, ASSIGNOR TO JORDAN MOTOR CAR COMPANY, INC., OF CLEVELAND, OHIO, A CORPORATION OF DELAWARE.

STEERING-COLUMN STRUCTURE.

Application filed January 15, 1925. Serial No. 2,490.

This invention relates to steering apparatus for automobiles and more particularly for means for preventing relative lateral movement between the steering shaft or post and the column in which the steering post is rotatably supported.

Due to the vibrations which occur in an automotive vehicle and to the thrusts such as those which may be transmitted from the steering gear and the like, it is essential to use a bushing construction between the post and steering column that will resist sufficient lateral movement of the post to cause it to contact with the column or the metal parts carried by the column to thus prevent rattling.

An object of the invention is to provide a suitable bushing which will maintain a tight engagement with the steering post as the packing material wears and hold the post against sufficient lateral movement to cause rattling.

A further object of the invention is to provide a bushing in which the wear is taken up by a member of compressible material maintained under a relatively heavy constant pressure to insure its constant engagement with the steering column at all times to hold it spaced from the column.

Another object is to provide a packing which may be readily removed and replaced.

With above and other objects in view the invention may be said to comprise the device as illustrated in the accompanying drawings, hereinafter described and particularly set forth in the appended claims together with such variations and modifications thereof as will be apparent to one skilled in the art to which the invention appertains.

Reference should be had to the accompanying drawings forming a part of this specification in which.

Figure 1:
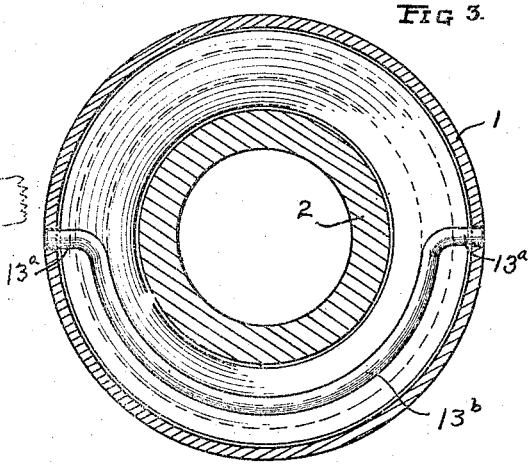
Fig. 1 is a fragmentary sectional view of the steering column and post showing the bearing for the post.
Figure 2:
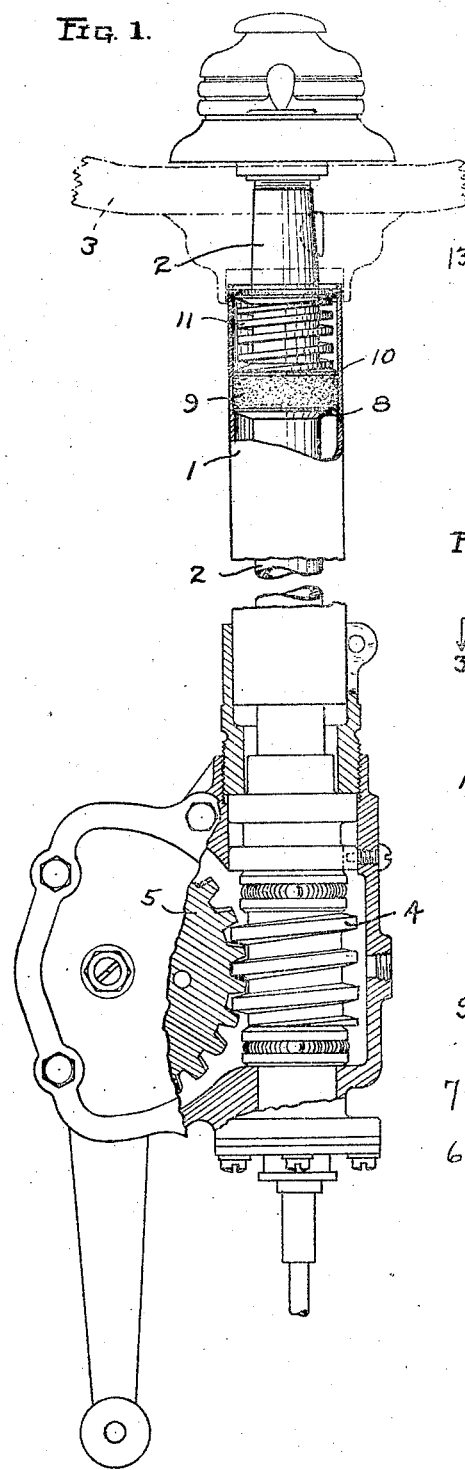
Fig. 2 is a longitudinal section through the bearing.
Figure 3:
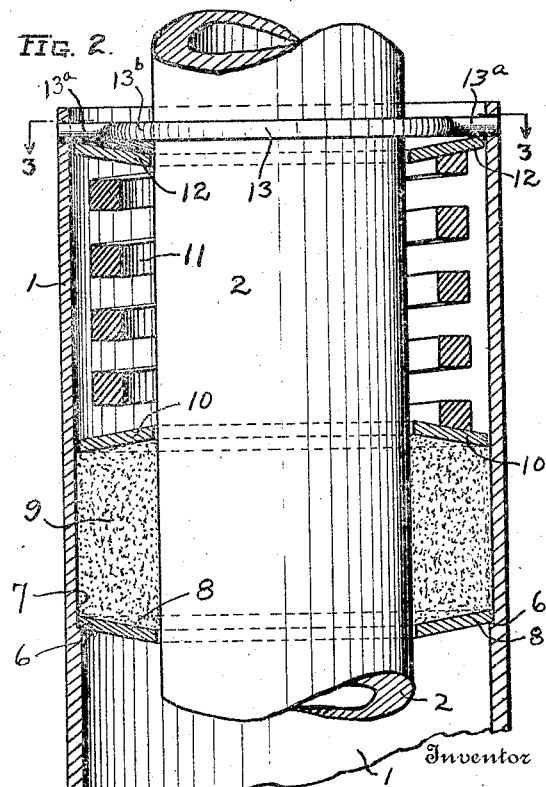
Fig. 3 is a section on line 3—3 of Fig. 2 with the parts normally inside the post removed.

Referring to the accompanying drawings, Fig. 1 shows the fixed column 1 in which is rotatably mounted the steering post 2 to the upper end of which the hand wheel 3 is fixed and upon the lower end of which is a worm 4 which meshes with a gear segment 5 through which the front wheel steering arms are actuated. The thrusts exerted by the segments 5 upon the post 2 or from other causes may put a lateral thrust upon the post 2 and consequently the bushings for the post are subjected to severe wear which tends to loosen the post in its bearings so that sufficient movements of the post to cause rattling are soon permitted.

The present invention comprises a bushing for the post which may be situated between the post and column, which bushing provides a yielding support for the shaft and which, due to its compression, will always engage the shaft and hold it spaced from the column even after considerable wear.

In the present embodiment of my invention the bushing is shown disposed near the upper end of the column 1 which is provided near its top with a suitable stop, such as an annular shoulder 6, thus causing the top 7 of the column to be of slightly enlarged internal diameter. The shoulder 7 forms a stop for an annular washer 8 which is preferably conical or dished downwardly and is of just the right external diameter to fit within the enlarged portion 7 of the column and to rest upon the shoulder 6 thereof. Upon the top of the washer 8 there is an annular packing 9 of compressible and wear resisting material which fits around the steering post 2 and the interior of the column 1. Upon the top of the packing 9 is a second dished washer 10 similar to the washer 8 but oppositely arranged so that the two washers present oppositely inclined conical faces to the packing ring 9, both washers having their concave sides toward the packing.

In order to maintain the packing material under suitable compression it is preferable to use a relatively heavy compression spring 11 which bears upon the top of the washer 10 and at its upper end bears against a washer 12 which is held within the upper end of the column 1 by any suitable retaining means such as the resilient pin 13. The pin 13 has outturned end portions 13ª which engage openings in the tubular column 1 at diametrically opposite points adjacent the upper end thereof, and an outwardly bowed central portion 13$^b$ which extends around one side of the post 2. The outer edge of the washer 11, which is dished and arranged with its concave side up, engages the portions 13$^a$ of the cross pin and the washer is thus retained in place. Since the spring 12 is a comparatively heavy spring, the packing 9 is maintained under heavy pressure tending to force the same laterally into engagement with the wall of the column 1 and the post 2 at all times, and, since the washers 8 and 10 are dished, the packing tightly grips the post and holds the same substantially centrally of the column 1.

The apertures through the washers 8 and 10 are of slightly greater diameter than the post 2 so that the post may be forced laterally a slight distance against the resiliency of the packing which forms an elastic support for the post, returning the same to central position without becoming permanently distorted. The yielding packing 9 prevents rattling since movements of the post caused by thrusts or vibrations are not sufficient to overcome the resistance of the heavily compressed elastic material. Preferably the spring 11 has a pressure of 50 or more pounds so that the packing 9 tends to always hold the post 2 concentric with the column 1 and out of engagement with the washers 8 and 10, thus preventing sufficient relative movement between the post and column to cause rattling.

To assemble the bushing in the column the controls and the hand wheel 3 are removed and the washer 8, packing ring 9, washer 10, spring 11 and washer 12 are slipped over the end of the post 2 and pushed down into place within the column. The washer 12 is then pressed down against the spring 11 and retaining pin 13 is sprung into place. To remove the bushing it is only necessary to remove the wheel 3 and spring the retaining portions 13$^a$ of the cross pin 13 out of engagement with the wall of the column, whereupon the parts of the bushing can be readily taken out of the column.

It will be obvious that my bushing may be so arranged that the compression spring is either above or below the packing as it is only essential that the packing be held between members and placed under considerable compression so that it will always engage the post.

It will thus be seen that I have provided a relatively simple construction which will effectively hold the post 2 against substantial movement laterally due to the vibrations or thrusts of the vehicle.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The combination with a fixed tubular steering column and a steering post rotatably mounted therein and spaced therefrom, of supporting means carried by the steering column extending into the annular space between the column and steering post but spaced from said post, compressible packing disposed in said annular space and adapted to be compressed between said column and post to contact therewith, resilient compressing means disposed in said annular space in cooperative relation with said packing, said packing and resilient compressing means being supported by said supporting means, and a retaining means carried by said column adapted to maintain said packing and resilient compressing means in compressed relation.

2. The combination with a fixed tubular steering column and a steering post rotatably mounted therein and spaced therefrom, of supporting means carried by the steering column extending into the annular space between the column and steering post but spaced from said post, compressible packing disposed in said annular space and adapted to be compressed between said column and post to contact therewith, resilient compressing means disposed in said annular space in cooperative relation with said packing, said packing and resilient compressing means being supported by said supporting means, and retaining means removably carried by said column to maintain said packing and resilient compressing means in compressed relation, whereby said packing and resilient compressing means may be readily removed from the column.

3. The combination with a fixed tubular steering column and a steering post rotatably mounted therein and spaced therefrom, of a shoulder carried by the steering column, an annular supporting member disposed on said shoulder, a compressible packing disposed in the annular space between said column and post, resilient compressing means disposed in cooperative relation with said packing to compress the packing into engagement with said column and post, said packing and resilient compressing means being supported on said annular supporting member, and removable means carried adjacent the top of said column to maintain the packing and spring compressing means in compressed relation.

4. The combination with a fixed tubular steering column and a steering post rotatably mounted therein and spaced therefrom, of mechanism for preventing rattle of the steering post and comprising, in combination, a compressible packing disposed in contacting engagement between the post and column, annular washers disposed above and below said packing and spaced from said steering post, a spring disposed between said column and post to compress said packing, said spring and packing being supported between said column and post by supports carried by said column and being maintained in compressed relation by retaining means carried by said column.

5. The combination with a fixed tubular steering column and a steering post rotatably mounted therein and spaced therefrom, of a shoulder carried by said steering column, an annular supporting washer supported on said shoulder and spaced from said steering post, compressible packing disposed in the annular space between said post and column in close contact therewith, annular washers spaced from said steering post disposed above and below said packing and adjacent thereto, a spring disposed between said column and post to compress said packing, said packing, washers and spring being supported by said supporting washer, and a removable retaining means carried by said column adapted to maintain said packing and spring in compressed relation.

In testimony whereof, I hereunto affix my signature.

STANLEY R. THOMAS.